United States Patent [19]

Mlachnik

[11] Patent Number: 5,079,805

[45] Date of Patent: Jan. 14, 1992

[54] FASTENER FOR PROTECTIVE SLEEVES

[75] Inventor: Albert A. Mlachnik, Greendale, Wis.

[73] Assignee: T C Manufacturing Co., Inc., Chicago, Ill.

[21] Appl. No.: 658,176

[22] Filed: Feb. 20, 1991

[51] Int. Cl.[5] .................. B65D 63/02; F16L 17/00; F16L 19/00; F16L 33/00

[52] U.S. Cl. .................. 24/20 LS; 24/329; 24/569; 285/373; 411/400

[58] Field of Search .................. 411/396, 400, 401; 24/20 LS, 23 W, 23 EE, 277, 335, 336, 329, 569; 285/373

[56] References Cited

U.S. PATENT DOCUMENTS

| | | | |
|---|---|---|---|
| 2,713,352 | 7/1955 | Schustack | 24/569 |
| 3,132,843 | 5/1964 | Brocato | 24/569 |
| 3,173,450 | 3/1965 | Halterman | 285/373 |
| 3,189,970 | 6/1965 | Barr | 285/373 |
| 3,700,008 | 10/1972 | Hackman | 285/373 |
| 4,269,178 | 5/1981 | Keene | 24/569 |
| 4,413,388 | 11/1983 | Akhtar-Khavari et al. | 285/373 |

Primary Examiner—Neill R. Wilson
Attorney, Agent, or Firm—Lee, Mann, Smith, McWilliams & Sweeney

[57] ABSTRACT

A fastener for securing a protective sleeve having a first sleeve end and a second sleeve end around an elongate member. The fastener includes a first clip having a chamber and an entryway adapted to receive and retain the first sleeve end and a second clip including a chamber and an entry way adapted to receive and retain the second sleeve end of the protective sleeve. The first clip includes a cylindrical bore and the second clip includes a threaded cylindrical bore. A bolt extends through the cylindrical bore of the first clip and through the threaded bore of the second clip such that the bolt is threadably fastened to the second clip and the first clip is connected to the second clip. Upon the proper rotation of the bolt, the second clip will be drawn closer to the first clip thereby tightening and securing the protective sleeve around the elongate member.

5 Claims, 2 Drawing Sheets

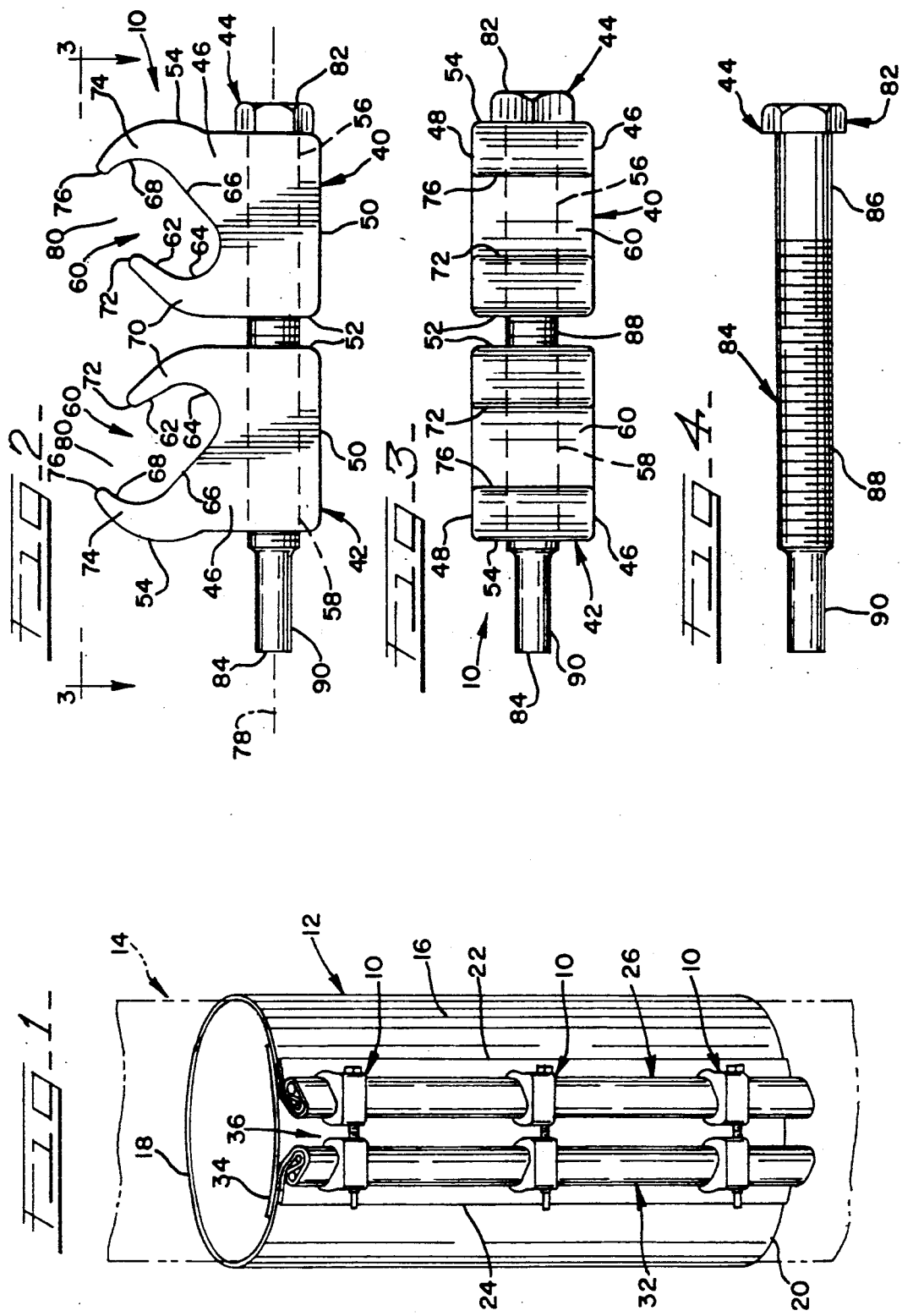

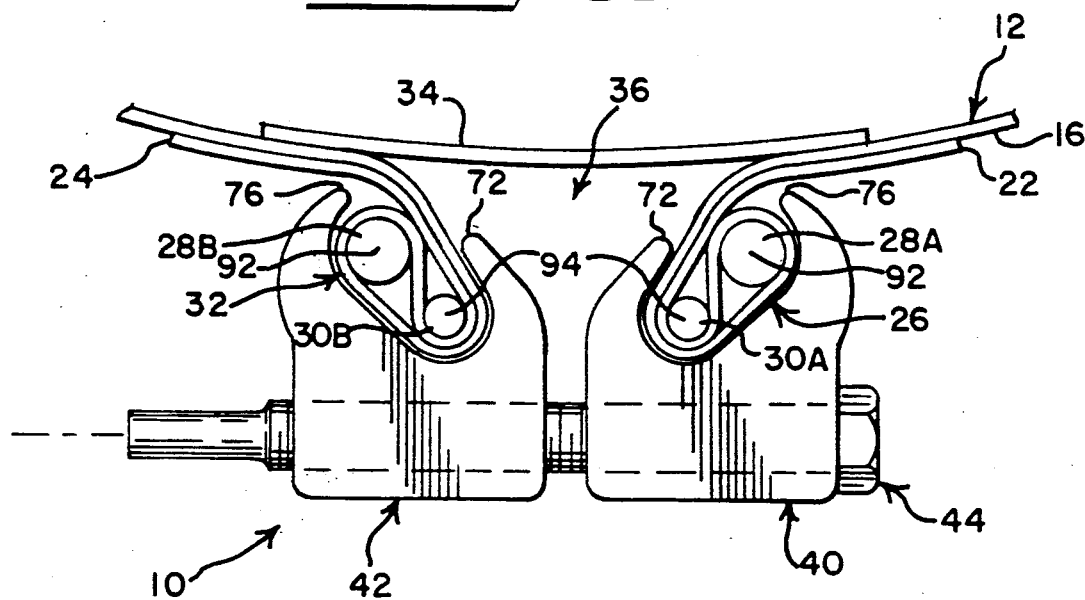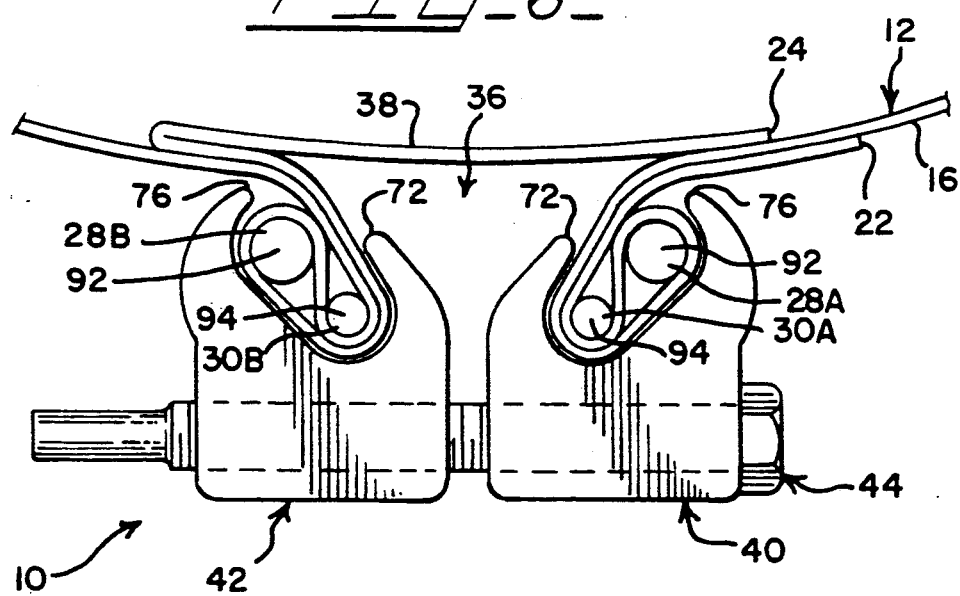

FASTENER FOR PROTECTIVE SLEEVES

BACKGROUND OF THE INVENTION

The present invention relates to a fastener for securing protective sleeves around elongate members such as piles. Piles used in offshore structures such as piers and causeways require external protection to prevent damage resulting from corrosion, decay and marine life which adhere to the surface of the piles. Piles which are exposed to the atmosphere or which are buried in the ground require similar protection. Protection is commonly provided to piles by wrapping various types of sheeting around the pile in the area to be protected.

One type of protective sleeve used in connection with piles is shown and described in U.S. patent application Ser. No. 576,075, filed on Aug. 31, 1990, and assigned to TC Manufacturing Co., Inc., the assignee of the present invention. This protective sleeve is used by forming a sleeve end at each end of the protective sleeve. Each sleeve end is formed by wrapping the sleeve between two rods such that the sleeve becomes secured therebetween. Each sleeve end is then drawn toward one another such that the sleeve is tightly wrapped around the pile with the use of a plurality of cable ties which extend around each sleeve end and through apertures within the sleeve.

The use of cable ties to connect sleeve ends together gives a very adequate connection but does have some disadvantages. For example, temporary clamps are often required to hold the sleeve ends in position while the cable ties can be inserted through the apertures and around the sleeve ends and the apertures may lead to some leakage. The amount of hoop tension which the cable ties can provide in the sleeve is also limited thereby limiting the degree of tightness with which the protective sleeve fits around the pile.

SUMMARY OF THE INVENTION

The present invention provides a fastener which is adapted to receive and securely retain the sleeve ends of a protective sleeve which has been wrapped around an elongate member such as a pile. The fastener includes a first clip and a second clip, each clip including a chamber having an entryway. Each sleeve end may be respectively inserted and withdrawn through the entryway in each clip. The first clip includes a cylindrical bore through which a threaded bolt extends. The second clip includes a threaded bore which is threadedly engaged to the bolt. Upon the proper rotation of the bolt, the second clip will be drawn towards or away from the first clip by the threads of the bolt to respectively tighten or loosen the sleeve around the elongate member.

The entryway and chamber of each clip is adapted to allow the insertion and removal of a sleeve end while preventing the removal of the sleeve end through the application of a tensile force on the sleeve. The fastener eliminates the need for providing apertures in the sleeve for the insertion of the cable ties and eliminates the need for any temporary clamps to hold the sleeve in position. The bolt may be tensioned such that the clips are drawn together to provide a large hoop stress in the protective sleeve to tightly draw the protective sleeve around the elongate member. The fastener also allows the sleeve ends to be initially positioned a specified distance apart from one another and then drawn together by the fastener until the second clip abuts the first clip whereupon no further tension may be applied to the protective sleeve, thereby preventing over stressing of the sleeve

DESCRIPTION OF THE DRAWINGS

FIG. 1 shows a sleeve having a first sleeve end and a second sleeve end wrapped around an elongate member shown in phantom.

FIG. 2 is a side elevational view of the fastener.

FIG. 3 is a top elevational view of the fastener taken along lines 3—3 of FIG. 2.

FIG. 4 is an elevational view of the bolt.

FIG. 5 shows the fastener in use in connection with a protective sleeve having a separate tongue.

FIG. 6 shows the fastener in use in connection with a protective sleeve having an integral tongue.

DESCRIPTION OF THE PREFERRED EMBODIMENT

A plurality of fasteners 10 are shown in FIG 1. The fasteners 10 are shown securing a sleeve 12 around an elongate member 14 shown in phantom. The sleeve 12 includes a pliable sheet material 16 which may be of any textile or plastic material or a combination of the two. The sheet 16 extends between an upper edge 18, a lower edge 20, a first edge 22 and a second edge 24. As shown in FIGS. 1 and 5, a first sleeve end 26 of the sleeve 12 includes a first rod 28A and a second rod 30A which securely grips the sheet 16 therebetween. A second sleeve end 32 of the sleeve 12 includes a first rod 28B and a second rod 30B which securely grips the sheet material 16 therebetween.

As shown in FIGS. 1 and 5, the sleeve ends 26 and 32 are located over a tongue 34 which is placed adjacent the elongate member 14 so as to seal the gap 36 between the sleeve ends 26 and 32. As shown in FIG. 6, a tongue 38 for sealing the gap 36 between the sleeve ends 26 and 32 may be formed from a portion of the sheet material 16 which extends beyond one of the sleeve ends 26 and 32.

The fastener 10 as best shown in FIGS. 2–4, includes a first clip 40, a second clip 42 and a bolt 44. Each clip 40 and 42 includes a front wall 46 and a rear wall 48 which is spaced apart from the front wall 46. Each clip 40 and 42 also includes a base 50, an inner wall 52 and an outer wall 54 which extend between the front wall 46 and the rear wall 48. A cylindrical bore 56 extends through the first clip 40 from the outer wall 54 to the inner wall 52. A threaded cylindrical bore 58 extends through the second clip 42 from the inner wall 52 to the outer wall 54. A first clip 40, the second clip 42 and the bolt 44 may all be made of various metals such as stainless steel or from various types of plastics. However, a non-corrosive material is preferred.

Each clip 40 and 42 additionally includes a chamber 60 which extends through the front wall 46 and the rear wall 48. Each chamber 60 is defined by a first wall portion 62 which is substantially planar, a second wall portion 64 which generally conforms to a portion of a cylinder, a third wall portion 66 which is substantially planar, and a fourth wall portion 68 which generally conforms to a portion of a cylinder. Each of the wall portions 62–68 extend from the front wall surface 46 to the rear wall surface 48. The first wall portion 62 and the inner wall 52 form a finger 70 having a tip 72. The fourth wall portion 68 and the outer wall 54 form a finger 74 having a tip 76. As best shown in FIG. 2, the third wall portion 66 is disposed at an angle to the longitudinal axis 78 which extends through the center of each bore 56 and 58. The first wall portion 62 of each chamber 60 is also disposed at an angle to the longitudinal axis 78 which angle is larger than the angle formed by the third wall portion 66. Each chamber 60 also includes an entryway 80 which is located between the tip 72 of the finger 70 and the tip 76 of the finger 74.

The bolt 44, best shown in FIG. 4, includes an hexagonal head 82 and a shaft 84. The shaft 84 includes a first smooth cylindrical portion 86 located adjacent to the head 82, a threaded portion 88 and a second smooth cylindrical portion 90 which is slightly smaller in diameter than the threaded portion 88 and the first cylindrical portion 86. The cylindrical bore 56 of the first clip 40 is sized so that the shaft 84 of the bolt 44 will slide longitudinally through the bore 56 in close engagement therewith. The threaded bore 58 of the second clip 42 is adapted to threadably engage the threaded portion 88 of the bolt 44. The second cylindrical portion 90 of the bolt 44 allows the shaft 84 to be partially inserted longitudinally into the threaded bore 58 of the second clip 42 provide an initial alignment of the threaded bore 58 with the threaded portion 88. The threaded portion 88 may then be rotated to engage the threaded bore 58.

In operation, the second rod 30A of the first sleeve end 26 will be inserted into the chamber 60 of the first clip 40 through the entryway 80. The second rod 30A will be inserted into the chamber 60 until the sheet material 16 engages the second wall portion 64 of the chamber 60. As the second rod 30A is being moved toward the second wall portion 64, the first rod 28A will be pushed towards the third wall portion 66 and the fourth wall portion 68 of the chamber 60. A similar operation is used for inserting the second sleeve end 32 into the chamber 60 of the second clip 42. The chamber 60 should be sized so that the sleeve ends 26 and 32 will substantially fill the chamber 60 upon their insertion, as shown in FIGS. 5 and 6. While the first rod 28A is shown as being larger in diameter than the second rod 30A, rods of the same size or a second rod 30A of larger diameter than the first rod 28A can be used with the fastener 10. Various different sizes of chambers 60 may be used as desired with each clip 40 and 42 to accommodate different sizes of sleeve ends 26 and 32. When a sleeve end 26 or 32 has been inserted into a chamber 60, the finger 70 will preferably extend a distance from the second wall portion 64 which is approximately equal to one-half the distance between the wall portion 64 and the tip 76 of the finger 74. The finger 74 will also preferably extend around the first rod 28 such that the tip 72 will extend past a line which extends through the center 92 of the first rod 28 and the center 94 of the second rod 30.

When the sleeve ends 26 and 32 have been inserted into the chambers 60 of the clips 40 and 42 as shown in FIGS. 5 and 6 the chambers 60 will prevent the sleeve ends 26 and 32 from rotating and will prevent the sleeve ends 26 and 32 from being removed from the chambers 60 by the application of a tensile force being applied to the sheet material 16. The sleeve ends 26 and 32 however may be removed from the clips 40 and 42 by pushing the first rod 28 outwardly through the entryway 80.

The sleeve ends 26 and 32 may be inserted into their respective chambers 60 while the clips 40 and 42 are connected to the bolt 44, or the sleeves 26 and 32 may be initially inserted into the chambers 60 of the clips 40 and 42 and then the bolt 44 may be inserted through the bores 56 and 58 to fasten the clips 40 and 42 together.

Once the sleeve ends 26 and 32 have been inserted into the chambers 60 and the clip 40 is connected to the clip 42 by the bolt 44, the bolt 44 may be rotated whereby the threaded portion 88 will draw the second clip 42 towards the first clip 40. Alternatively, upon the proper rotation of the bolt 44, the second clip 42 will be moved away from the first clip 40. The bolt 44 may be used to draw the clips 40 and 42 together to achieve any desired hoop stress within the sheet material 16 which extends around the elongate member 14. As the clips 40 and 42 are drawn together, eventually the inner walls 52 of each clip will abut one another whereby the sleeve 12 cannot be tensioned any further.

Various features of the invention have been particularly shown and described in connection with the illustrated embodiment of the invention, however, it must be understood that these particular arrangements merely illustrate, and that the invention must be given its fullest interpretation within the terms of the appended claims.

What is claimed is:

1. In a sleeve assembly adapted to be securely wrapped and held around an elongate member for protecting said elongate member, wherein said sleeve assembly comprises a pliable sheet having a first end and a second end; a freely moveable and unconnected first rod having said first end of said sheet wrapped around said first rod; a freely moveable and unconnected second rod extending parallel to and adjacent said first rod, said second rod being separated from said first rod by said sheet, said first end of said sheet being wrapped around said second rod, such that said first end of said sheet is securely gripped between said first rod and said second rod; a freely moveable and unconnected third rod having said second end of said sheet wrapped around said third rod; and a freely moveable and unconnected fourth rod parallel to and adjacent said third rod, said second end of said sheet being wrapped around said fourth rod, said third rod being separated from said fourth rod by said sheet, such that said second end of said sheet is securely gripped between said third rod and said fourth rod; wherein the improvement comprises a fastener for securing said sleeve around said elongate member, said fastener including:
   a first clip including a chamber specifically shaped to receive and retain said first and second rods and said sleeve end wrapped therearound;
   a second clip including a chamber specifically shaped to receive and retain said third and fourth rods and said sleeve end wrapped therearound;
   means for connecting said first clip to said second clip; and
   means for positioning said first clip relative to said second clip to hold and tighten said sleeve around said member.

2. The fastener of claim 1 wherein each said connecting means and said positioning means comprise:
   a bore extending through said first clip;
   a threaded bore extending through said second clip; and
   a bolt extending through said bore of said first clip and threadably connected to said threaded bore of said second clip, whereby upon the proper rotation of said bolt, said bolt will draw said second clip towards said first clip.

3. The fastener of claim 1 wherein each said chamber includes an entryway through which a sleeve end may be inserted and removed from said chamber.

4. The fastener of claim 1 wherein each said chamber is defined by a first generally planar wall portion, a second generally cylindrical wall portion, a third generally planar wall portion and a fourth generally cylindrical wall portion.

5. The fastener of claim 4 wherein an entrywall is located between said first generally planar wall portion and said fourth generally cylindrical wall portion.

* * * * *